US005403099A

United States Patent [19]

Stein

[11] Patent Number: 5,403,099

[45] Date of Patent: Apr. 4, 1995

[54] ROLLER BEARING FOR ROLLERS IN PRINTING UNITS OF A PRINTING MACHINE

[75] Inventor: Lothar Stein, Hirschberg, Germany

[73] Assignee: Heidelberger Druckmaschinen AG, Heidelberg, Germany

[21] Appl. No.: 172,839

[22] Filed: Dec. 23, 1993

[30] Foreign Application Priority Data

Dec. 23, 1992 [DE] Germany ........................ 42 43 657.5

[51] Int. Cl.$^6$ ........................ F16C 35/06; F16C 13/02

[52] U.S. Cl. ........................ 384/437; 384/419

[58] Field of Search ................ 384/428, 432, 434–437, 384/542; 242/68.4

[56] References Cited

U.S. PATENT DOCUMENTS

| | | | |
|---|---|---|---|
| 1,262,479 | 4/1918 | Gardner | 384/434 X |
| 1,379,818 | 5/1921 | Hinnekens | 384/436 |
| 1,735,192 | 11/1929 | Williams et al. | 384/437 X |
| 2,431,069 | 11/1947 | Mitchell . | |
| 3,994,543 | 11/1976 | Melugin | 384/435 |
| 4,412,753 | 11/1983 | Linn | 384/437 |
| 4,759,286 | 7/1988 | Witczak | 101/216 |
| 4,953,462 | 9/1990 | Kröber | 101/216 |

FOREIGN PATENT DOCUMENTS

| | | |
|---|---|---|
| 0328879 | 7/1992 | European Pat. Off. . |
| 2080372 | 11/1971 | France . |
| 683910 | 11/1939 | Germany . |
| 1024985 | 2/1958 | Germany . |
| 1282657 | 11/1968 | Germany . |
| 3617594 | 12/1986 | Germany . |
| 1601603 | 11/1981 | United Kingdom . |

OTHER PUBLICATIONS

Japanese Patent Abstract No. 60-23621, Shirahata, Feb. 6, 1985.

Windmöller & Hölscher Publication W 40 103, Jul. 5, 1967, pp. 2–8, "Lagerung für die Achsschenkel . . . ".

*Primary Examiner*—Thomas R. Hannon

*Attorney, Agent, or Firm*—Herbert L. Lerner; Laurence A. Greenberg

[57] ABSTRACT

Roller bearing for a roller in a printing unit of a printing machine having a receptacle for a tang formed on an end of a roller, and a hold-down device movable for respectively locking and releasing the tang on the end of the roller, includes a device for fastening, with spring loading, the receptacle and the hold-down device radially to one another with the roller tang formlockingly received therebetween, the fastening device having a longitudinal axis, and the hold-down device being swivelable, with a force overcoming the spring loading, about the longitudinal axis of the fastening device and away from the roller tang.

11 Claims, 2 Drawing Sheets

ROLLER BEARING FOR ROLLERS IN PRINTING UNITS OF A PRINTING MACHINE

SPECIFICATION

The invention relates to a roller bearing for rollers in printing units of a printing machine, and more particularly to bearing supports for ink rollers, dampening rollers or the like in an offset rotary printing machine, including a receptacle for a pin or tang formed on the end of the roller, and a hold-down device movable for respectively locking and releasing the pin or tang on the end of the roller.

The state of the prior art is disclosed in published German Patent Document DE 36 17 594 A1 which describes a roller bearing which is formed of a receptacle open at the top thereof and, in a vertical section taken in a plane of the roller axis, is angle-shaped, the receptacle being connectible to a machine frame, and an annular hold-down device rotatable in a given rotary direction about the roller axis so as to open the roller bearing hold-down device for receiving the roller tang in the receptacle then open at the top thereof, the annular hold-down device being rotatable in a rotary direction opposite the given rotary direction so as to close the roller bearing. In the foregoing heretofore known arrangement, a ball bearing is mounted on the pin or tang at the end of the roller and is inserted into the open receptacle and firmly held therein by turning the hold-down device. Although a roller bearing of this type can be closed relatively quickly and easily opened, nevertheless, because of the requisite bearing play, it is unsuitable for high-speed machines and is highly vulnerable to soiling, which impairs its function. Play exists in the rotatable hold-down device because of production tolerances, so that the bearing of the roller is also disposed with play in the receptacle, yet such play should be avoided because it impairs ink transfer. Although the aforementioned reference does describe a protection against opening in the direction of rotation, nevertheless, it offers no protection against unauthorized rotation in the opposite direction, so that an opening may result from simple vibrations or in a reverse running of the machine as is usual at creep speed. Because the available space is so tight, problems arise with the use of a hold-down ring.

The published European Patent Document EP 0 328 879 B1 discloses a roller bearing with a roller lock, wherein a bearing ring having a guide tang flattened on two sides thereof is stuck onto a pin or tang disposed on the end of a roller, and the bearing ring is inserted with the guide tang thereof through a slit from above into a round receptacle and, after being rotated, is secured therein by a spring pin. If stringent demands as to print quality are made, such a roller bearing must also be equipped with an eccentrically operative readjustment device, in order to compensate for the play in the movement of the bearing parts relative to one another which is necessary for disassembly and reassembly.

It is accordingly an object of the invention to provide, for rollers in printing units of a printing machine, a roller bearing which is of simple construction and made up of as few individual parts as possible, and which, in minimal space, produces a reliable, play-free bearing for rollers even at high rotary speeds and enables a rapid dismantling or disassembly and an error-free reinstallation or reassembly of rollers.

With the foregoing and other objects in view, there is provided, in accordance with the invention, a roller bearing for a roller in a printing unit of a printing machine, including a receptacle for a tang formed on an end of a roller, and a hold-down device movable for respectively locking and releasing the tang on the end of the roller, comprising means for fastening, with spring loading, the receptacle and the hold-down device radially to one another with the roller tang formlockingly received therebetween, the fastening means having a longitudinal axis, and the hold-down device being swivelable, with a force overcoming the spring loading, about the longitudinal axis of the fastening means and away from the roller tang.

In accordance with another feature of the invention, the roller bearing includes pretensioned spring means for spring loading the fastening means, and a bearing body forming the receptacle and being formed with a bore extending radially to an axis of the roller, the fastening means comprising an axially and rotatably movable bolt guidingly extending through the bore receptacle and through the spring means, the bolt being affixed to the hold-down device.

In accordance with a further feature of the invention, the hold-down device is formed with a stop surface, and the bearing body is formed with an opposing surface constituting a counterpart to the stop surface, the opposing surface of the bearing body being lifted away from the stop surface of the hold-down device in a closed condition of the roller bearing wherein the roller tang is formlockingly received between the hold-down device and the receptacle.

In accordance with an added feature of the invention, the receptacle and the hold-down device are formed with respective supporting surfaces for the roller tang, the supporting surfaces forming shell-like segments of a circular arc having a center point located in the axis of the roller.

In accordance with an additional feature of the invention, the roller bearing includes a nut threadedly mounted on the bolt, and the spring means comprise pretensioned cup springs braced at one side thereof against the bearing body and at the other side thereof against the nut.

In accordance with yet another feature of the invention, the hold-down device is disposed above the receptacle and partly encircles the tang of the roller over a predetermined angular range, and the receptacle disposed below the hold-down device partly encircles the tang of the roller over an angular range greater than the predetermined angular range for the hold-down device.

In accordance with a concomitant feature of the invention, the bolt is formed with a head connected to the hold-down device so that the bolt and the hold-down device are mutually fixed against relative rotation, the bolt head being formed with means engageable by a tool for swiveling the bolt together with the hold-down device.

Manufacturing costs for the roller bearing according to the invention are minimized because of the relatively simple components thereof. By clamping the hold-down device to the receptacle by means of a spring-loaded bolt, radial play is precluded, and the forces acting radially upon the roller bearing are controllable. Preferably, cup springs are used for the spring loading, because great spring forces can thereby be applied within minimal space. For opening the roller bearing so as to be able to receive the roller tang or pin therein, and for closing the roller bearing, a tool can be used which engages the bolt head at the end thereof. A roller bearing with the features according to the invention is largely free of becoming soiled and can be used both for fixed tangs or pins at the end of a roller as well as for roller bearings mounted on the pin or tang end. No changes have to be made in the roller pin or tang, nor are any adapter members required. A roller lock having the novel structural features according to the invention can be employed universally.

Dependent claims 2–7 include further characteristics for the advantageous embodiment of the concept of the invention.

Other features which are considered as characteristic for the invention are set forth in the appended claims.

Although the invention is illustrated and described herein as embodied in a roller bearing for rollers in printing units of a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
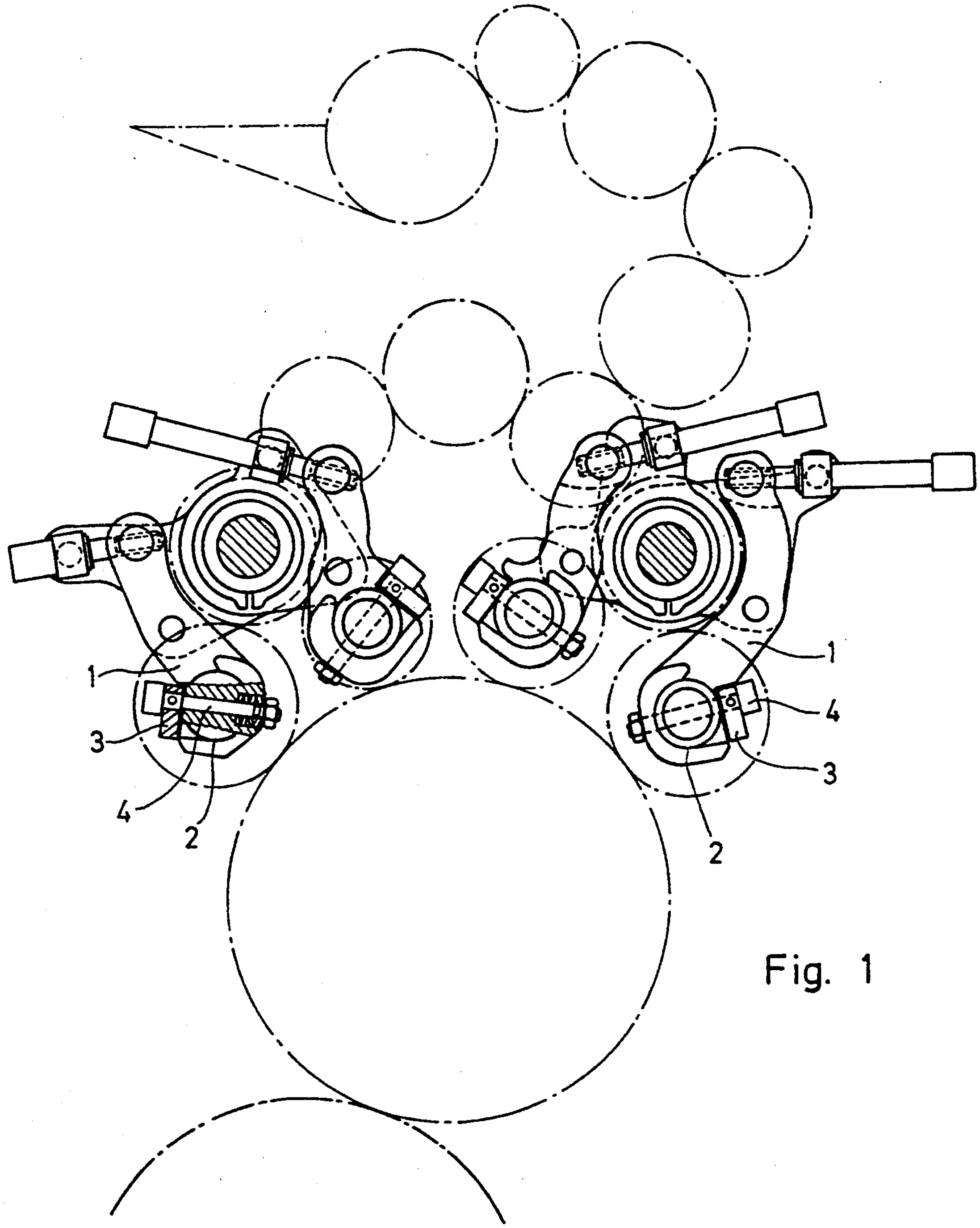
FIG. 1 is a partly diagrammatic, cross-sectional view of a roller bearing arrangement constructed in accordance with the invention and assembled in a printing machine.

Referring now to the drawings and, first, particularly to FIG. 1 thereof, there is shown therein an exemplary embodiment of a roller bearing arrangement or assembly formed, in this example, of four roller bearings, respectively, including a receptacle 2, a hold-down device 3, and a bolt 4 joining them both together, the receptacle 2, if necessary or desirable, being fixedly connectable directly or by an adjustable rocker 1 to a frame of the printing machine.

Figure 2:
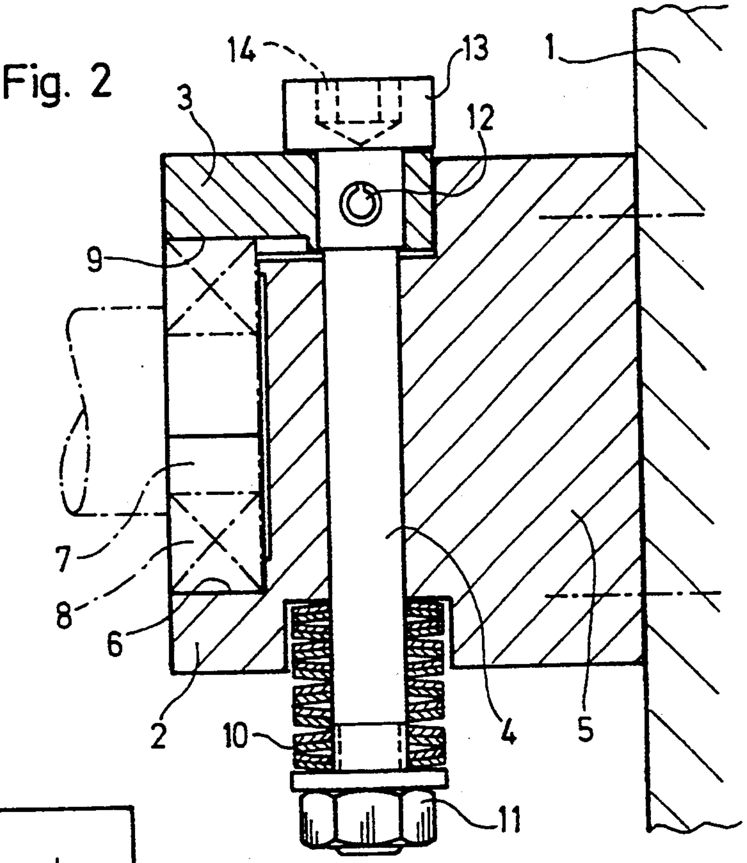
FIG. 2 is a fragmentary enlarged vertical sectional view of FIG. 1, showing a roller bearing of the invention.
Figure 3:
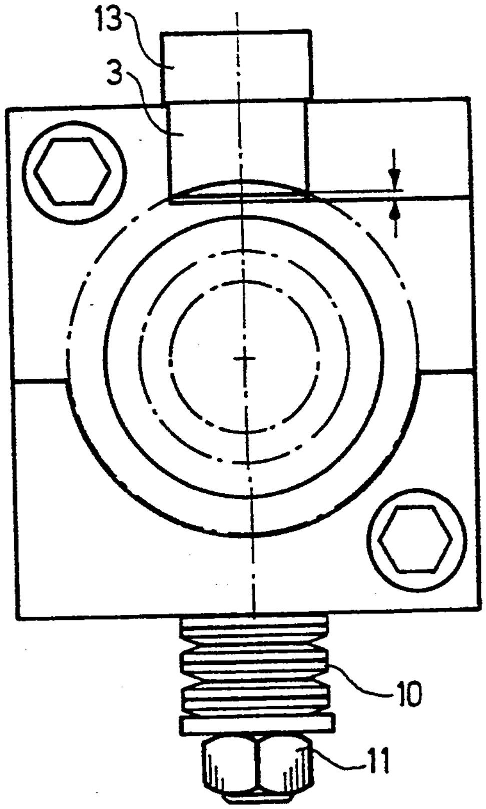
FIG. 3 is an end elevational view of FIG. 2, as seen from the left-hand side of the latter figure.
Figure 4:
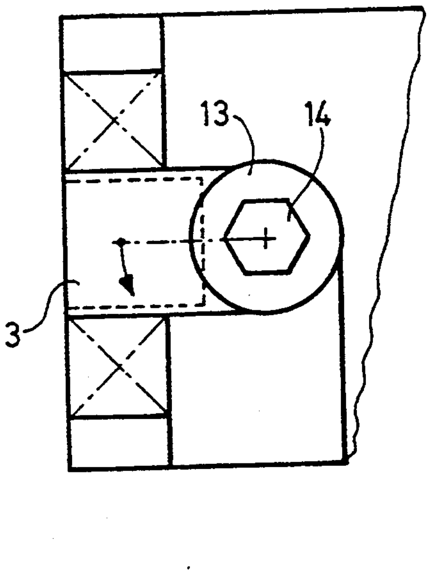
FIG. 4 is a fragmentary top plan view of FIG. 2.

In the embodiment of the invention shown in detail in FIGS. 2 to 4, the receptacle 2 is formed on an end face of a bearing body 5 facing towards a roller shown in phantom at the left-hand side of FIG. 2, the bearing body 5, in turn, being connectible to the machine frame via the rocker arm 1. The receptacle is formed at a lower region thereof with a supporting surface 6, defining an opening at the top thereof for receiving therein a pin or tang 7 formed on the end of the roller or for receiving therein a bearing 8 mounted on the pin or tang 7. The supporting surface 6 extends over a predetermined angular range. Disposed somewhat diametrically opposite the supporting surface 6 is the hold-down device 3, which, on its underside, is likewise formed with an arcuate supporting surface 9 lying from above either against the pin or tang 7 or against the bearing 8 mounted on the pin or tang 7. The hold-down device 3 and the receptacle 2 thus enclose the pin or tang 7 or the bearing 8 over a given circumferential range which ensures reliable retention, and are braced radially against one another by springs 10. The hold-down device 3 and the receptacle 2 are joined together by the bolt 4 disposed in a bore which is formed in the bearing body 5 and extends radially to the roller axis, the hold-down device 3 and the receptacle 2 being braced against one another by the springs 10 formed as cup springs, which are slid onto the bolt 4. Tensioning forces are adjustable by tightening or loosening the nut 11 which is screwed onto the bolt 4. In the exemplary embodiment illustrated in the figures, the hold-down device 3 and the bolt 4 are joined together by a screw 12 or other means in a manner that they are fixed against relative rotation. For opening and closing the roller bearing, a tool is connected to the head 13 of the bolt 4, at an end face thereof, and is insertable, by way of example, into a hexagonal socket 14 formed in the bolt head 13. In this manner, the hold-down device 3 is swivelable through an angle of 90°, so that, when extended to the side, it releases the bearing 8 or the tang 7 so that they can be lifted out of the receptacle 2. In the closed roller bearing, the tang 7 or the bearing 8 on the tang 7 is form-lockingly secured by the rounded or arcuate supporting surfaces 9 and 6, respectively, of the hold-down device 3 and the receptacle 2, as seen more clearly in FIG. 3. In this regard, it is noted that a force-locking connection is one which connects two elements together by force external to the elements, as opposed to a form-locking connection which is provided by the shapes of the elements themselves. For opening the roller bearing, the hold-down device 3 must be raised in the axial direction of the bolt 4 a distance corresponding to the elevation of the arcuate supporting surface 9, as viewed in FIG. 3. Correspondingly, upon closure of the bearing, an axial movement of the bolt 4 is required. In order to permit the spring forces of the cup springs 10 to become operative when the bearing is closed, a gap, as shown between opposite arrows in FIG. 3, is provided between the underside of the hold-down device 3 and the adjacent surface of the bearing body 5, so that the hold-down device 3 and the bearing body 5 cannot come into contact with this surface when the bearing is closed.

A roller bearing of the aforedescribed construction enables a simple, fast and reliable operation by a swiveling of the hold-down device 3 through an angle of 90° and form-locking securing of the roller tang when the roller bearing is closed. The spring forces acting radially in the roller bearing are controllable. Improper servicing or operation due to overly firm tensioning or clamping and possible plastic deformation of the parts of the roller bearing are thus precluded. The roller bearing with the characteristics of the invention does not require any adaptation of the roller bearing and of a bearing mounted on the tang of the roller, respectively, so that both fixed roller tangs and rotating roller tangs can be clamped or fastened by means of the roller bearing. The result is not only a defined location of the hold-down device 3 when the device is opened, but also, primarily, an unequivocal engagement or catching of the hold-down device when the bearing is closed. It is especially advantageous, moreover, that errors in the axial angle are compensated for by the resilient clamping or fastening.

In a further feature of the invention, provision is made for the form lock to be brought about, not by the aforedescribed rounded supporting surface 9 in the hold-down device 3 above the bearing 8 or above the shaft tang 7 on which the bearing 8 is mounted, but rather by means of a corresponding construction between the hold-down device 3 and the bearing body 5 with the receptacle 2.

I claim:

1. Roller bearing for a roller in a printing unit of a printing machine, including a receptacle for a tang formed on an end of a roller, and a hold-down device movable for respectively locking and releasing the tang on the end of the roller, comprising a bolt for fastening, with spring loading, the receptacle and the hold-down device radially to one another with the roller tang form-lockingly received therebetween, said bolt having a longitudinal axis, and said hold-down device having a shape for form-locking said hold-down device against rotation about said longitudinal axis and said hold-down device being releasable from a form-locked position by swiveling, with a force overcoming the spring loading, about said longitudinal axis of said fastening means and away from the roller tang.

2. Roller bearing according to claim 1, including pretensioned spring means for spring-loading said fastening means, and a bearing body forming said receptacle and being formed with a bore extending radially to an axis of the roller, said fastening means comprising an axially and rotatably movable bolt guidingly extending through said bore receptacle and through said spring means, said bolt being affixed to said hold-down device.

3. Roller bearing according to claim 2, wherein the hold-down device is formed with a stop surface, and said bearing body is formed with an opposing surface constituting a counterpart to said stop surface, said opposing surface of said bearing body being lifted away from said stop surface of the hold-down device in a closed condition of the roller bearing wherein the roller tang is formlockingly received between the hold-down device and the receptacle.

4. Roller bearing according to claim 2, including a nut threadedly mounted on said bolt, and wherein said spring means comprise pretensioned cup springs braced at one side thereof against said bearing body and at the other side thereof against said nut.

5. Roller bearing according to claim 1, wherein the receptacle and the hold-down device are formed with respective supporting surfaces for the roller tang, said supporting surfaces forming shell-like segments of a circular arc having a center point located in the axis of the roller.

6. Roller bearing according to claim 1, wherein the hold-down device is disposed above the receptacle and partly encircles the tang of the roller over a predetermined angular range, and the receptacle disposed below the hold-down device partly encircles the tang of the roller over an angular range greater than the predetermined angular range for the hold-down device.

7. Roller bearing for a roller in a printing unit of a printing machine, including a receptacle for a tang formed on an end of a roller, and a hold-down device movable for respectively locking and releasing the tang on the end of the roller, comprising means for fastening, with spring loading, the receptacle and the hold-down device radially to one another with the roller tang form-lockingly received therebetween, said fastening means having a longitudinal axis, and said hold-down device being swivelable, with a force overcoming the spring loading, about said longitudinal axis of said fastening means and away from the roller tang, pretensioned spring means for spring-loading said fastening means, and a bearing body forming said receptacle and being formed with a bore extending radially to an axis of the roller, said fastening means comprising an axially and rotatably movable bolt guidingly extending through said bore receptacle and through said spring means, said bolt being affixed to said hold-down device, wherein said bolt is formed with a head connected to the hold-down device so that said bolt and the hold-down device are mutually fixed against relative rotation, said bolt head being formed with means engageable by a tool for swiveling said bolt together with the hold-down device.

8. Roller bearing for a roller in a printing unit of a printing machine, comprising:

a receptacle for a tang formed on an end of a roller;

a hold-down device for clamping the roller tang against said receptacle;

a bolt extending between said receptacle and said hold-down device, said bolt fastening said receptacle and said hold-down device radially to one another with spring loading and with the roller tang received therebetween;

said bolt having a longitudinal axis, and said hold-down device being selectively swivelable, with a force overcoming the spring loading, about said longitudinal axis between a first position in which said hold-down device formlockingly locks the tang against said receptacle and a second position away from the roller tang in which the roller tang is released.

9. The roller bearing according to claim 8, wherein said hold-down device has an arcuate bearing surface for receiving the roller tang therein and for locking said hold-down device against rotation relative to said receptacle.

10. The roller bearing according to claim 8, wherein said bolt is formed with a head connected to said hold-down device so that said bolt and said hold-down device are mutually fixed against relative rotation, said bolt head being formed with means engageable by a tool for swiveling said bolt together with said hold-down device.

11. The roller bearing according to claim 8, wherein said first position and said second position are offset from one another by approximately a quarter turn.

* * * * *